United States Patent [19]

Flowers

[11] 4,259,269
[45] Mar. 31, 1981

[54] CHEMICAL FEED SYSTEM

[75] Inventor: William F. Flowers, Bolingbrook, Ill.

[73] Assignee: Nalco Chemical Company, Oak Brook, Ill.

[21] Appl. No.: 86,662

[22] Filed: Oct. 19, 1979

[51] Int. Cl.³ .............................................. B01F 3/04
[52] U.S. Cl. ................................. 261/151; 210/198.1; 261/36 R; 261/DIG. 11; 261/DIG. 46
[58] Field of Search ................. 261/29, 36 R, 151, 75, 261/DIG. 11, DIG. 46; 210/198 R, 198.1

[56] References Cited

U.S. PATENT DOCUMENTS

| 3,094,133 | 6/1963 | Treanor | 261/DIG. 46 |
|---|---|---|---|
| 3,094,134 | 6/1963 | Currie | 261/DIG. 46 |
| 3,196,892 | 7/1965 | Savage et al. | 261/DIG. 46 |
| 3,291,117 | 12/1966 | Shenkin | 261/DIG. 46 |
| 3,430,823 | 3/1969 | Hunsaker | 261/DIG. 46 |
| 3,450,265 | 6/1969 | Krevsch et al. | 261/DIG. 46 |
| 3,754,741 | 8/1973 | Whitehurst et al. | 261/DIG. 46 |
| 3,756,220 | 9/1973 | Tehrani et al. | 261/DIG. 75 |
| 4,091,056 | 5/1978 | Hamalainen et al. | 261/75 X |

FOREIGN PATENT DOCUMENTS 1343664  1/1974  United Kingdom ............ 261/DIG. 46

*Primary Examiner*—Richard L. Chiesa

[57] ABSTRACT

Apparatus for handling, diluting and adding a biocide chemical to a water cooling system which includes a venturi device powered by the motive water in the cooling system and connected to a biocide chemical supply and to a control network, including flow control means and valve means for obtaining controlled feed of the chemical into the system.

9 Claims, 6 Drawing Figures

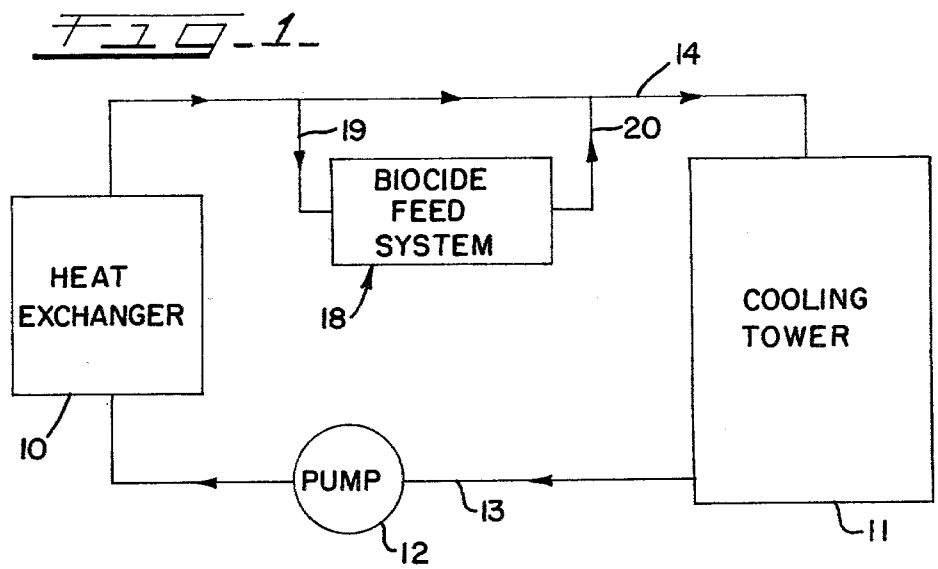
FIG-1-
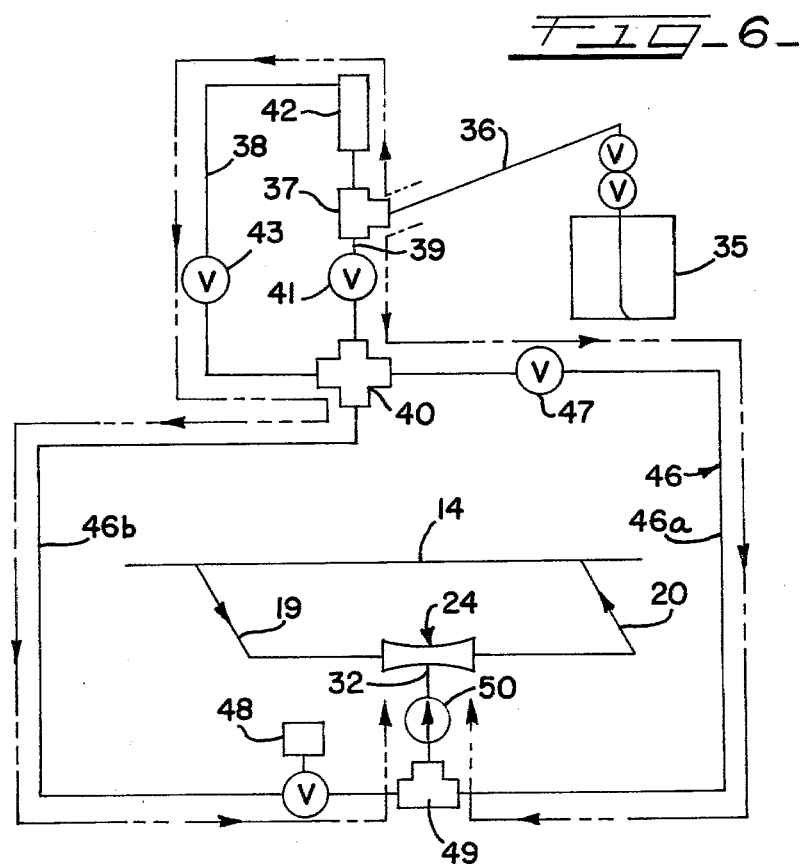
FIG-6-

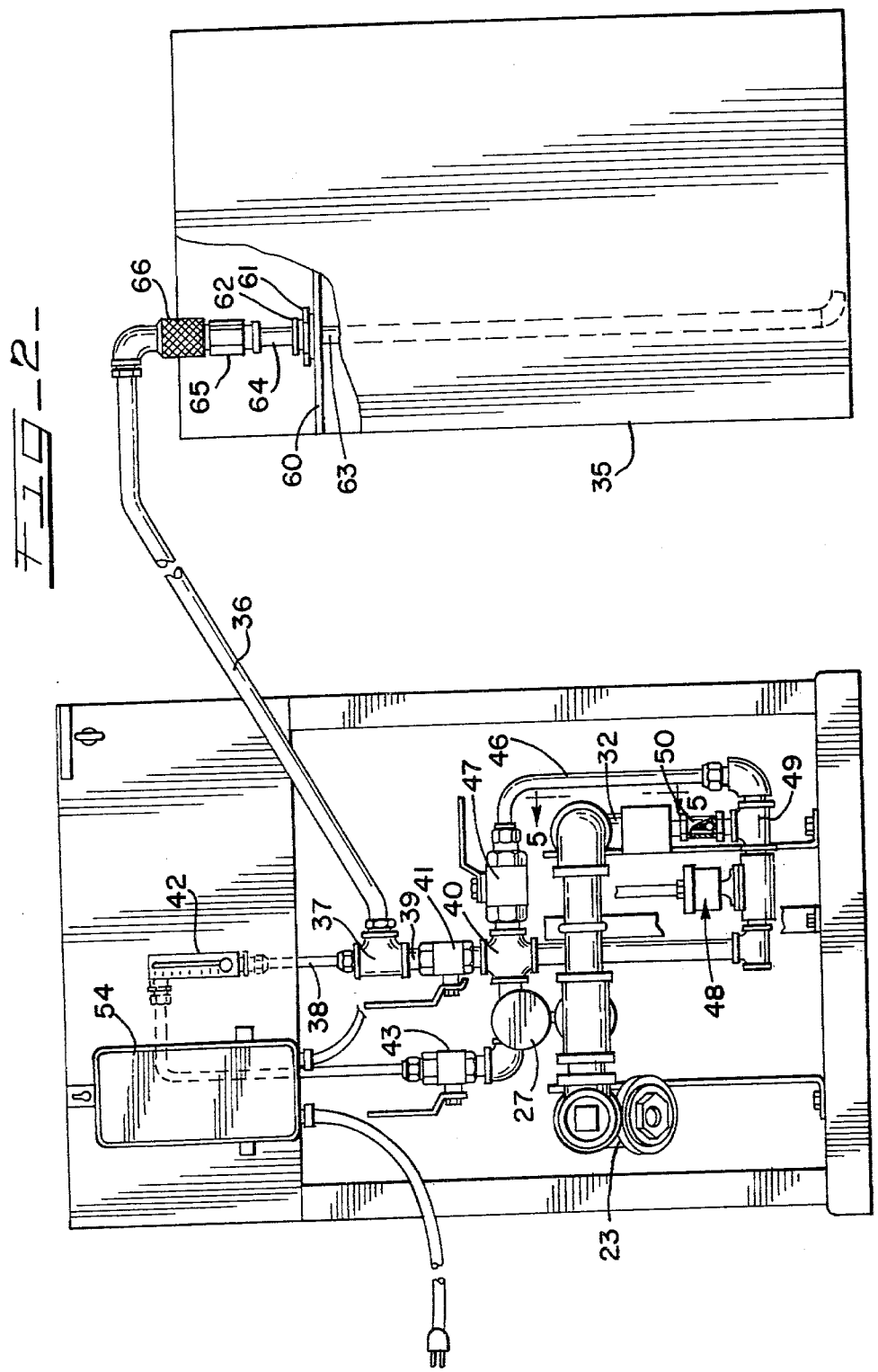

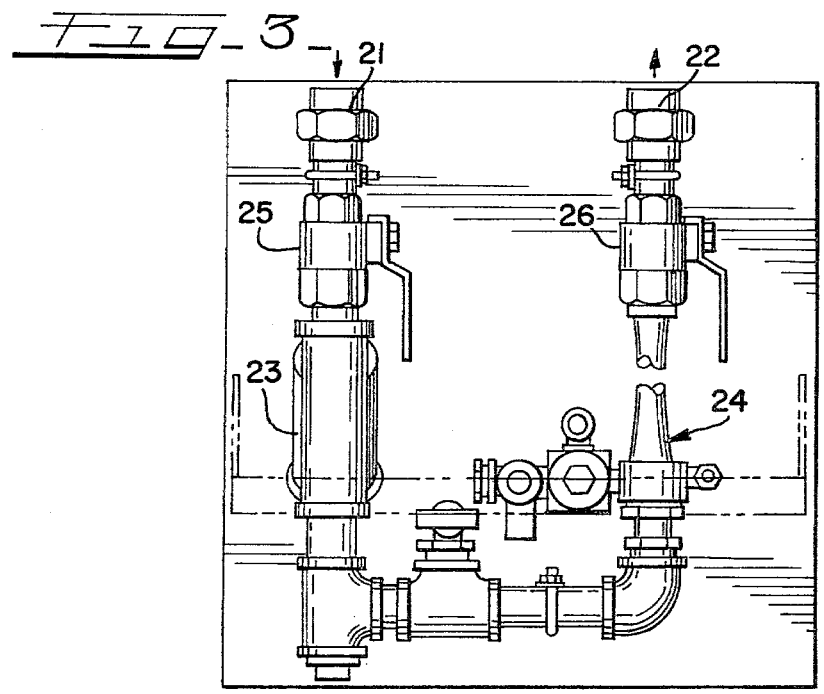
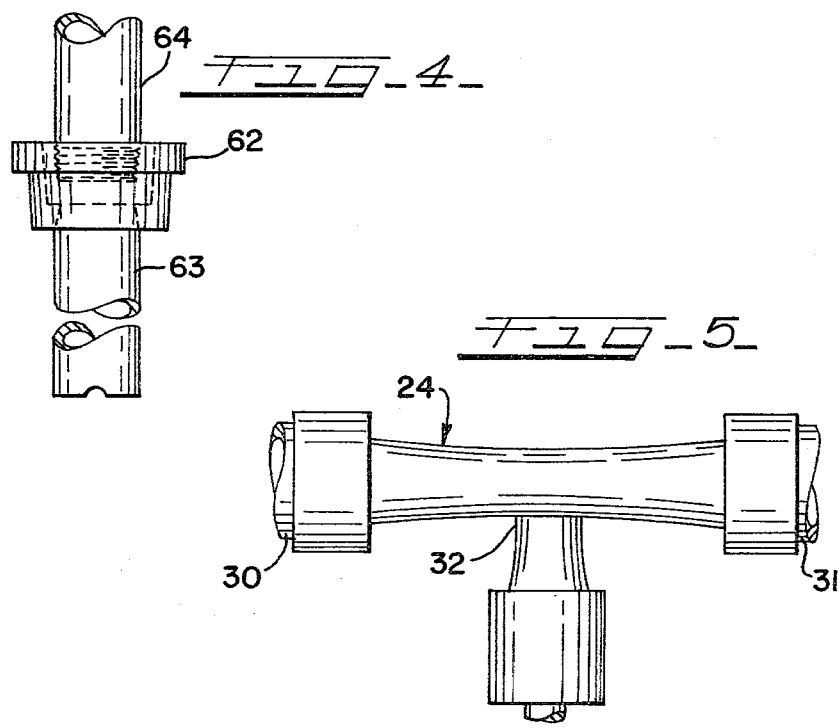

CHEMICAL FEED SYSTEM

This invention relates in general to an apparatus for feeding a biocide chemical into a water cooling system for controlling microbiological growth, and more particularly, to an apparatus for feeding a biocide chemical to a water cooling system on demand or as needed wherein the chemical is maintained under suction until it is diluted.

Water cooling systems which include cooling towers that expose the cooling water to the atmosphere promote microbiological growth that impedes the cooling action when such growth covers cooling surfaces of the cooling tower and/or heat exchange surfaces in a heat exchanger served by the cooling tower. Biocide chemicals are used to treat the cooling water to control the microbiological growth. Such biocide chemicals, especially in their concentrated form, are hazardous to any person coming in contact with the chemicals. One such chemical made by Rohm & Haas is Kathon 886 CT, which is is a skin sensitizer that causes on contact skin burns and eye damage and may even be fatal if swallowed or brought into contact with the skin. Accordingly, it is necessary to provide safe shipping of such a product, safe feeding of such a product into a water cooling system, and safe handling of the product by persons working with the product for a water cooling system.

The apparatus of the present invention accomplishes the safe handling, diluting and adding to a water cooling tower system hazardous biocide chemicals. According to the present invention, the concentrated product is always handled under suction such that any leak in the apparatus is inward. Further, the apparatus is structured so that connecting a supply of chemical to the apparatus for adding to a cooling system will prevent spillage, and once connected the adding of the chemical can be manually or automatically controlled. The apparatus provides for the immediate dilution of the concentrated product upon being added to the system. Moreover, the drums of the concentrated biocide chemical are provided with special fittings to avoid the necessity of tipping the drums when withdrawing the chemical from the drums.

It is therefore an object of the present invention to provide a new and improved apparatus for handling, diluting and adding hazardous biocide chemicals to a water cooling system.

A further object of this invention is in the provision of a providing an apparatus for adding biocide chemicals to a water cooling system which does not require an independent power source but depends upon the motive water in the cooling system for accomplishing the addition of the biocide chemical and which accomplishes the addition safely by maintaining the concentrated product under vacuum at all times until it is diluted and added to the system.

A still further object of this invention is in providing an apparatus for safely handling, diluting and adding hazardous biocide chemicals to a water cooling system having a water tower wherein the chemicals are provided in drums that do not need to be tipped during the process of withdrawing the chemicals from the drums.

Other objects, features and advantages of the invention will be apparent from the following detailed disclosure, taken in conjunction with the accompanying sheets of drawings, wherein like reference numerals refer to like parts, in which:

FIG. 1 is a block diagram of a cooling system with the biocide feed system apparatus of the present invention;

FIG. 2 is an elevational view of the apparatus of the present invention for handling the biocide chemical and handling the chemical supply as carried in a drum;

FIG. 3 is a top plan view of the apparatus shown in FIG. 2 with some parts omitted and other parts broken away for purposes of clarity;

FIG. 4 is a greatly enlarged detailed view of the suction tube assembly at the drum;

FIG. 5 is an elevational view of the venturi device taken substantially along line 5—5 of FIG. 2; and FIG. 6 is a schematic diagram of the biocide feed apparatus according to the invention and illustrating some of the possible flow paths of the biocide chemical in a control piping network.

Referring now to the drawings and particularly to FIG. 1, a water cooling system is illustrated for cooling a heat exchanger 10. The system includes a water cooling tower 11 of any suitable type which, when the water flows therethrough, allows exposure of the water to the atmosphere to give off heat. A suitable pump 12 is provided for circulating the water between the heat exchanger and the cooling water. The cool water outlet of the cooling tower is connected to the cool water inlet of the heat exchanger by a cool water line 13, while the warm water input of the cooling tower is connected to the warm water line 14. The warm water delivered to the cooling tower will be cooled in the cooling tower prior to being circulated back to the heat exchanger. While the pump 12 is shown mounted in the cool water return line, it could be mounted in the warm water return line 14 if so desired.

The biocide chemical feed system of the present invention is generally indicated by the numeral 18 in FIG. 1 and is connected into the warm water return line 14 ahead of the cooling tower so that the biocide chemical is added to the water of the cooling system ahead of the cooling tower and downstream from the heat exchanger. It may be appreciated that the biocide feed system could be connected to the cool water line to add the biocide chemical just ahead of the heat exchanger. The biocide feed system not only includes the apparatus for controlling the feed of biocide but also a supply of biocide chemical as it is important according to the present invention to provide the safe handling, diluting and feeding of the biocide chemical into a water cooling system. The biocide feed system depends upon the motive water being circulated between the cooling tower and heat exchanger for accomplishing the addition of the biocide chemical to the water in the cooling system. Accordingly, the warm water return line 14 is tapped to provide an inlet line 19 to the feed system and also tapped to provide an outlet line 20 from the feed system to the warm water return line 14.

Referring now more particularly to FIGS. 2, 3, 4 and 5, the inlet line 19 will be connected to an inlet coupling 21, while the outlet line 20 will be connected to an outlet coupling 22. From the inlet coupling 21 the motive water taken from the warm water return line 14 flows through a loop which includes a strainer 23 and a venturi device 24 and then returns to the outlet coupling 22 and back to the warm water return line 14. Manually operable shutoff valves 25 and 26 are provided respectively at the inlet and outlet couplings 21 and 22 for either permitting the flow of water through the venturi device 24 during the time it is desired to add a biocide chemical or preventing flow therethrough especially if it is desired to shut down the feed system for maintenance or other purposes. A pressure gauge 27 is provided in the line going to the venturi device and the pressure may be controlled as desired by the shutoff valves 25 and 26.

The venturi device 24 may be of any suitable type such as an ejector or an eductor and, as seen in FIG. 5, includes an inlet 30 and an outlet 31 through which flows the motive water for driving the venturi device. A suction inlet 32 is provided at the throat of the venturi device and is interconnected through a control piping network with a supply of biocide chemical. As is well known, as the water flows through the venturi device, a suction or vacuum is created at the throat where the suction inlet 32 is located so that if the suction inlet is connected to a supply of fluid, it will be drawn into the venturi device and added to the flow of the water going through the venturi device. It will be particularly appreciated that the venturi device 24 therefore maintains the suction inlet 32 and whatever is connected thereto under a suction or vacuum at all times when the system is operating and when there is a flow of water through the venturi device.

The biocide chemical being drawn in by the venturi device into the motive water is supplied from a drum 35 which is connected into the system by a connecting line 36. The connecting line 36 is coupled to a T-fitting 37 that is connected at one side to a loop 38 and at the other side to a stub 39 leading to a cross fitting 40. A manual shutoff valve 41 is provided in the stub 39 to selectively allow flow from the T-fitting 37 to the cross 40. The loop 38 is also connected to the cross 40 and includes therein a rotometer 42 for controlling flow and a manual shutoff valve 43. When biocide chemical flows through the loop 38, the flow is controlled by the rotometer 42 that can be programmed for any desired flow within the capacity of the system.

A further loop is formed and connected to the cross 40 by a line 46. Connected to the cross 40 a manual shutoff valve 47 is provided in the loop leg 46a of loop 46, while also connected to the cross is a solenoid operated valve in loop leaf 46b. Between the valves 47 and 48 a T-fitting 49 is provided and interconnected to the suction inlet 32 of the venturi device 24 through a check valve 50. The check valve 50 allows flow only toward the venturi device and prohibits back flow from the venturi device into the loop 46. The check valve is a gravity operated ball valve of the usual type and further provided with spring loading in order to render it the most failsafe.

The solenoid operated valve 48 is controlled by a timer 54 according to a pre-programmed schedule for metering chemical to the venturi device. If no electrical power is available, the solenoid operated valve can be eliminated.

The system provides a variety of feed situations depending upon what is needed. For example, as illustrated in the schematic diagram of FIG. 6, the biocide chemical coming from the drum 35 can either be directed through the loop 38 or either leg of the loop 46. For example, if it is desired to continuously slug feed a biocide chemical into the water cooling system, the manual valve 43 would be shut off to prevent flow through the loop 38, and with the valves 41 and 47 open, the biocide chemical would flow through the T-fitting 37, the open valve 41, the cross 40, the open valve 46, the T-fitting 49, the check valve 50, and into the venturi device through the suction inlet 32. In this instance, the flow would be through the loop leg 46a and slug feeding would be accomplished. The flow would follow the arrowed line illustrated in FIG. 6 along the loop leg 46a.

If it is desired to have a timed slug feed of the biocide chemical into the water cooling system, the valve 43 would be closed, the valve 41 would be open and the valve 47 would be closed so that the biocide chemical would flow through the loop leg 46b of the loop 46 and through the timer actuated valve 48. In this setup of the system, the biocide chemical would come through the connecting line 36 to the T-fitting 37, through the valve 41, the cross 40, the loop leg 46b, the timer valve 48, the T-fitting 49, the check valve 50, and into the venturi device 24 through the suction inlet 32. This would accomplish periodic slug feeding. The timer could be set to open the valve 48 at any desired interval.

If a continual controlled or metered flow of biocide chemical is desired into the water cooling system, the flow would then be directed through the loop 38 which includes the rotometer 42 and the loop leg 46a. In this arrangement the valve 41 would be closed, while the valve 43 would be open and the valve 47 would also be open. Thus, the biocide chemical would flow from the connecting line 36 to the T-fitting 37 through the loop 38 including the rotometer 42, the valve 43, the cross 40, the partial loop 46a, the valve 47, the T-fitting 49, and the check valve 50 into the venturi device 24 through the suction inlet 32.

Additionally, it may be appreciated that coming through the rotometer and loop 38 flow could be directed through the cross 40, through the time valve 48 and to the venturi device, thereby providing a periodic metered flow. This flow would follow the arrowed line along loop 38 and loop leg 46b.

Inasmuch as the loops 38 and 46 are selectively connected to the venturi device 24, it will be appreciated that whenever biocide chemical flows through these loops, they will be under suction or vacuum and will not leak outwardly to allow loss of biocide chemical or the exposure of biocide to any persons at the system. The only part of the system that is under pressure is the loop coming from the warm water return line 14 through the venturi device 24. Immediately after the biocide chemical enters the venturi device, it becomes diluted with the motive water, thereby reducing its strength.

The slug feed cycle can also be used to extract rinsate from the drum 35 when it is desired to flush the drum. It will be appreciated that when the drum is essentially empty, water can be introduced into the drum and then this can be extracted through the slug feed loop and fed to the cooling water to flush the drum in a safe manner.

The drums 35 are prepared with fittings to insure the safe handling of the biocide chemical as it is withdrawn from the drum. The drum includes a top panel 60 in which a fitting 61 is provided which receives in threaded engagement a bushing 62. A suction tube 63 of an inert plastic such as polyethylene that extends down into the drum and is provided with an open end at the bottom of the drum is threadedly engaged with the bushing 62. The bushing 62 is of a suitable inert plastic such as polypropylene. A stub line 64 is threadedly mounted into the upper end of the bushing 62 and provided at its upper end with a quick disconnect male fitting 65. A mating quick disconnect female fitting 66 is provided on the end of the line for connecting to the fitting 65. The fittings 65 and 66 are valved and these valves automatically close upon disconnect of the fittings and then open when the fittings are placed together in locked relation. Accordingly, this promotes the safe handling of the biocide chemical in the drum 35, and the operator is never exposed to an open drum.

Thus, at all times during the withdrawing of biocide chemical from the drum the fittings to the drum and the lines connected thereto are maintained under suction or vacuum so that any leaks would be inward. This enhances the safe handling and fitting of the biocide chemical into the water cooling system. Further, in view of the fittings on the drum and the tube extending through the bottom of the drum, it can be appreciated that the drum need not be tipped in order to withdraw all of the biocide chemical from the drum. The suction tube 63 is disposable once the supply of biocide chemical has been disposed of in the drum.

It should be recognized that the apparatus of the present invention could be used to safely handle and inject any hazardous chemical into a liquid stream.

It will be understood that modifications and variations may be effected without departing from the scope of the novel concepts of the present invention, but it is understood that this application is to be limited only by the scope of the appended claims.

The invention is hereby claimed as follows:

1. In a water cooling system for a heat exchanger, a water cooling tower connected by water lines to the heat exchanger and pumping means for circulating the water between and through the cooling tower and the heat exchanger, the improvement in an apparatus for adding a biocide chemical to the water to control microbiological growth within the cooling tower and the heat exchanger surfaces served by the tower, said apparatus comprising a pipe having an inlet connected to the water circulating line of the system ahead of the cooling tower and an outlet connected to said line downstream from the inlet and ahead of the cooling tower thereby causing water flow through the pipe, venturi means in said pipe utilizing the water flow to produce suction, and means supplying a biocide chemical to the suction means whereby the biocide is under suction at all times in the supply means and is drawn into the pipe water flow.

2. The apparatus defined in claim 1, wherein said supply means includes means for metering the biocide chemical to the suction producing means.

3. The apparatus defined in claim 1, wherein said supply means includes a container of biocide chemical, and a control piping network connected between the container and the suction producing means.

4. The apparatus defined in claim 3, wherein the supply means includes a quick disconnect coupling at the container having fittings with valves that automatically close on disconnection.

5. The apparatus defined in claim 3, wherein said control piping network includes means for selectively slug or meter feeding of the chemical to said suction producing means.

6. The apparatus defined in claim 5, wherein said control piping network further includes means ahead of the suction producing means for allowing flow of chemical only in the direction toward said suction producing means.

7. The apparatus defined in claim 5, wherein the means for meter feeding includes a rotometer.

8. The apparatus defined in claim 3, wherein said control piping network includes means for selectively periodically feeding a metered amount of the chemical to said suction producing means.

9. The apparatus defined in claim 8, wherein the periodic feeding means includes a timer actuated solenoid valve.

* * * * *